(12) United States Patent
McInnis et al.

(10) Patent No.: US 10,457,578 B1
(45) Date of Patent: Oct. 29, 2019

(54) AUTOMATED SULFUR BURNER FOR AGRICULTURAL IRRIGATION

(71) Applicants: Gary McInnis, Yakima, WA (US); Erik Gaskell, Yakima, WA (US)

(72) Inventors: Gary McInnis, Yakima, WA (US); Erik Gaskell, Yakima, WA (US)

( * ) Notice: Subject to any disclaimer, the term of this patent is extended or adjusted under 35 U.S.C. 154(b) by 0 days.

(21) Appl. No.: 16/016,123

(22) Filed: Jun. 22, 2018

(51) Int. Cl.
| | |
|---|---|
| *C02F 1/66* | (2006.01) |
| *A01G 25/16* | (2006.01) |
| *C02F 1/00* | (2006.01) |
| *C01B 17/54* | (2006.01) |
| *C02F 1/68* | (2006.01) |

(52) U.S. Cl.
CPC ............... *C02F 1/66* (2013.01); *A01G 25/16* (2013.01); *C01B 17/54* (2013.01); *C02F 1/008* (2013.01); *C02F 1/68* (2013.01); *C02F 2209/06* (2013.01); *C02F 2209/42* (2013.01)

(58) Field of Classification Search
None
See application file for complete search history.

(56) References Cited

U.S. PATENT DOCUMENTS

| | | |
|---|---|---|
| 127,008 A | 5/1872 | Akin |
| 197,474 A | 11/1877 | Jones |
| 1,254,992 A | 1/1918 | Descamps |
| 1,422,327 A | 7/1922 | Allen |
| 2,807,522 A | 9/1957 | Russell |
| 3,627,134 A | 12/1971 | Mattson |
| 4,039,289 A | 8/1977 | Collins et al. |
| 4,526,771 A | 7/1985 | Forbush et al. |
| 4,966,757 A | 10/1990 | Lewis et al. |
| 5,389,084 A | 2/1995 | Horan et al. |
| 5,395,338 A | 3/1995 | Gaba |
| 5,417,659 A | 5/1995 | Gaba |
| 5,601,532 A | 2/1997 | Gaba |
| 5,832,785 A | 11/1998 | Costahaude et al. |
| 6,080,368 A | 6/2000 | Jackson |
| 6,248,299 B1 | 6/2001 | Jackson |
| 6,424,676 B1 | 7/2002 | Kono et al. |
| 6,427,029 B1 | 7/2002 | Kono et al. |
| 6,500,391 B1 | 12/2002 | Jackson |
| 6,506,347 B1 | 1/2003 | Jackson |
| 6,689,326 B1 | 2/2004 | Jackson |
| 7,052,670 B2 | 5/2006 | Labraña Valdivia et al. |
| 7,141,220 B2 | 11/2006 | Jackson |
| 7,182,919 B2 | 2/2007 | Jackson |
| 7,288,861 B1 | 10/2007 | Willard et al. |
| 7,339,139 B2 | 3/2008 | Yang et al. |

(Continued)

FOREIGN PATENT DOCUMENTS

| | | |
|---|---|---|
| CN | 101067282 A | 11/2007 |
| CN | 102516232 A | 6/2012 |

(Continued)

*Primary Examiner* — Richard C Gurtowski
(74) *Attorney, Agent, or Firm* — Seed IP Law Group LLP

(57) ABSTRACT

A sulfur burner system can include an electronic control system, various sensors coupled to the electronic control system, and various components electronically controlled by the electronic control system. The sensors can include a pH sensor coupled to an irrigation pipe, a thermometer, and a pressure transducer. The components controlled by the electronic control system can include valves, igniters, and pumps or variable frequency drives thereof.

17 Claims, 3 Drawing Sheets

(56) References Cited

U.S. PATENT DOCUMENTS

| | | |
|---|---|---|
| 7,416,668 B1 | 8/2008 | Theodore |
| 7,455,773 B1 | 11/2008 | Harmon et al. |
| 7,491,336 B2 | 2/2009 | Markham et al. |
| 7,563,372 B1 | 7/2009 | Theodore |
| 7,566,400 B2 | 7/2009 | Harmon et al. |
| 7,767,162 B2 | 8/2010 | Jackson et al. |
| 7,867,398 B2 | 1/2011 | Harmon et al. |
| 7,879,245 B2 | 2/2011 | Markham et al. |
| RE42,239 E | 3/2011 | Jackson |
| 7,967,989 B2 | 6/2011 | Gong et al. |
| 7,967,990 B2 | 6/2011 | Theodore |
| 8,092,118 B2 | 1/2012 | Atkin et al. |
| 8,097,168 B2 | 1/2012 | Theodore et al. |
| 8,101,070 B2 | 1/2012 | Theodore et al. |
| 8,101,083 B2 | 1/2012 | Ruehr et al. |
| 8,192,626 B2 | 6/2012 | Theodore et al. |
| 8,206,655 B2 | 6/2012 | Gong et al. |
| 8,236,178 B2 | 8/2012 | Ruehr et al. |
| 8,357,305 B2 | 1/2013 | Theodore et al. |
| 8,580,122 B2 | 11/2013 | Theodore |
| 8,828,230 B2 | 9/2014 | Theodore |
| 8,877,068 B2 | 11/2014 | Theodore et al. |
| 8,888,890 B2 | 11/2014 | Theodore et al. |
| 8,951,479 B2 | 2/2015 | Jackson et al. |
| 8,961,793 B2 | 2/2015 | Gong et al. |
| 9,682,877 B2 | 6/2017 | Gong |
| 2008/0099404 A1* | 5/2008 | Markham ............... C02F 1/281 210/663 |
| 2011/0318239 A1* | 12/2011 | Gong ...................... C01B 17/54 422/187 |
| 2012/0067969 A1 | 3/2012 | Gong |
| 2013/0071641 A1 | 3/2013 | DiBattista et al. |

FOREIGN PATENT DOCUMENTS

| | | |
|---|---|---|
| CN | 102093356 B | 12/2012 |
| CN | 103173722 A | 6/2013 |
| JP | 9-18864 A | 1/1997 |
| JP | 9-19778 A | 1/1997 |
| JP | 3469438 B2 | 11/2003 |
| JP | 4004653 B2 | 11/2007 |
| JP | 2011-23855 A | 2/2011 |
| JP | 2013-63653 A | 4/2013 |
| TW | 201315606 A1 | 4/2013 |
| WO | 2006/050634 A1 | 5/2006 |
| WO | 2016/183450 A1 | 11/2016 |

* cited by examiner

AUTOMATED SULFUR BURNER FOR AGRICULTURAL IRRIGATION

BACKGROUND

Technical Field

The present disclosure is related generally to sulfur burner systems, and more particularly to automated sulfur burner systems for use in agricultural irrigation systems.

Description of the Related Art

Sulfur burners are used to burn or combust elemental sulfur or other materials or chemical compounds containing or including sulfur, often in the presence of gaseous oxygen, such as purified gaseous oxygen or gaseous oxygen contained within air in a surrounding environment, thereby producing gaseous sulfur dioxide. The resulting gaseous sulfur dioxide can be mixed into a stream of water, such as within a venturi injector or other mixing device, and the sulfur dioxide can then react with the water to produce sulfurous acid.

BRIEF SUMMARY

A sulfur burner system coupled to an irrigation pipe may be summarized as comprising: an inlet pipe coupled to the irrigation pipe at a first joint; an outlet pipe coupled to the irrigation pipe at a second joint, the second joint downstream of the first joint along the irrigation pipe; and a pH sensor coupled to the irrigation pipe at a measurement location, the measurement location downstream of the second joint along the irrigation pipe.

The inlet pipe may be configured to supply water from the irrigation pipe at the first joint to the sulfur burner system. The outlet pipe may be configured to supply sulfurous acid from the sulfur burner system to the irrigation pipe at the second joint. The pH sensor may be configured to measure the pH within the irrigation pipe at the measurement location. The sulfur burner system may further comprise an electronic control system. The electronic control system may be electronically and communicatively coupled to the pH sensor to receive data representative of pH measurements taken by the pH sensor from the pH sensor.

The sulfur burner system may include an electrically-powered hot surface igniter and the electronic control system may be electronically and communicatively coupled to the hot surface igniter to provide commands to the hot surface igniter. The sulfur burner system may include an electrically-powered air intake valve and the electronic control system may be electronically and communicatively coupled to the air intake valve to provide commands to the air intake valve. The sulfur burner system may include an electrically-powered water intake valve and the electronic control system may be electronically and communicatively coupled to the water intake valve to provide commands to the water intake valve. The sulfur burner system may include a holding tank and a pressure transducer to measure a liquid level within the holding tank, and the electronic control system may be electronically and communicatively coupled to the pressure transducer to receive data representative of liquid level measurements taken by the pressure transducer from the pressure transducer.

A method may be summarized as comprising: coupling an inlet pipe of a sulfur burner system to an irrigation pipe at a first joint; coupling an outlet pipe of the sulfur burner system to the irrigation pipe at a second joint, the second joint downstream of the first joint along the irrigation pipe; and coupling a pH sensor to the irrigation pipe at a measurement location, the measurement location downstream of the second joint along the irrigation pipe.

The method may further comprise: using the pH sensor to take a measurement of a pH of fluids within the irrigation pipe at the measurement location; transmitting data representative of the measurement from the pH sensor to an electronic control system of the sulfur burner system; and comparing the measurement of the pH with a desired pH of the fluids within the irrigation pipe at the measurement location. The method may further comprise: determining that the measurement of the pH matches the desired pH; and taking no further action in response to the measurement of the pH. The method may further comprise: determining that the measurement of the pH is higher than the desired pH; transmitting a command to an injection pump of the sulfur burner system to begin pumping sulfurous acid from the sulfur burner system, through the outlet pipe, through the second joint, and into the irrigation pipe at a first rate; and pumping sulfurous acid through the outlet pipe, through the second joint, and into the irrigation pipe at the first rate.

The method may further comprise: using the pH sensor to take a second measurement of the pH of the fluids within the irrigation pipe at the measurement location; transmitting data representative of the second measurement from the pH sensor to the electronic control system; and comparing the second measurement of the pH with the desired pH. The method may further comprise: determining that the second measurement of the pH matches the desired pH; and taking no further action in response to the second measurement of the pH. The method may further comprise: determining that the second measurement of the pH is higher than the desired pH; transmitting a second command to the injection pump of the sulfur burner system to begin pumping sulfurous acid from the sulfur burner system, through the outlet pipe, through the second joint, and into the irrigation pipe at a second rate that is faster than the first rate; and pumping sulfurous acid through the outlet pipe, through the second joint, and into the irrigation pipe at the second rate. The method may further comprise: determining that the second measurement of the pH is lower than the desired pH; transmitting a second command to the injection pump of the sulfur burner system to begin pumping sulfurous acid from the sulfur burner system, through the outlet pipe, through the second joint, and into the irrigation pipe at a second rate that is slower than the first rate; and pumping sulfurous acid through the outlet pipe, through the second joint, and into the irrigation pipe at the second rate.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with the technology have not been shown or described in detail to avoid unnecessarily obscuring descriptions of the implementations.

Figure 1:
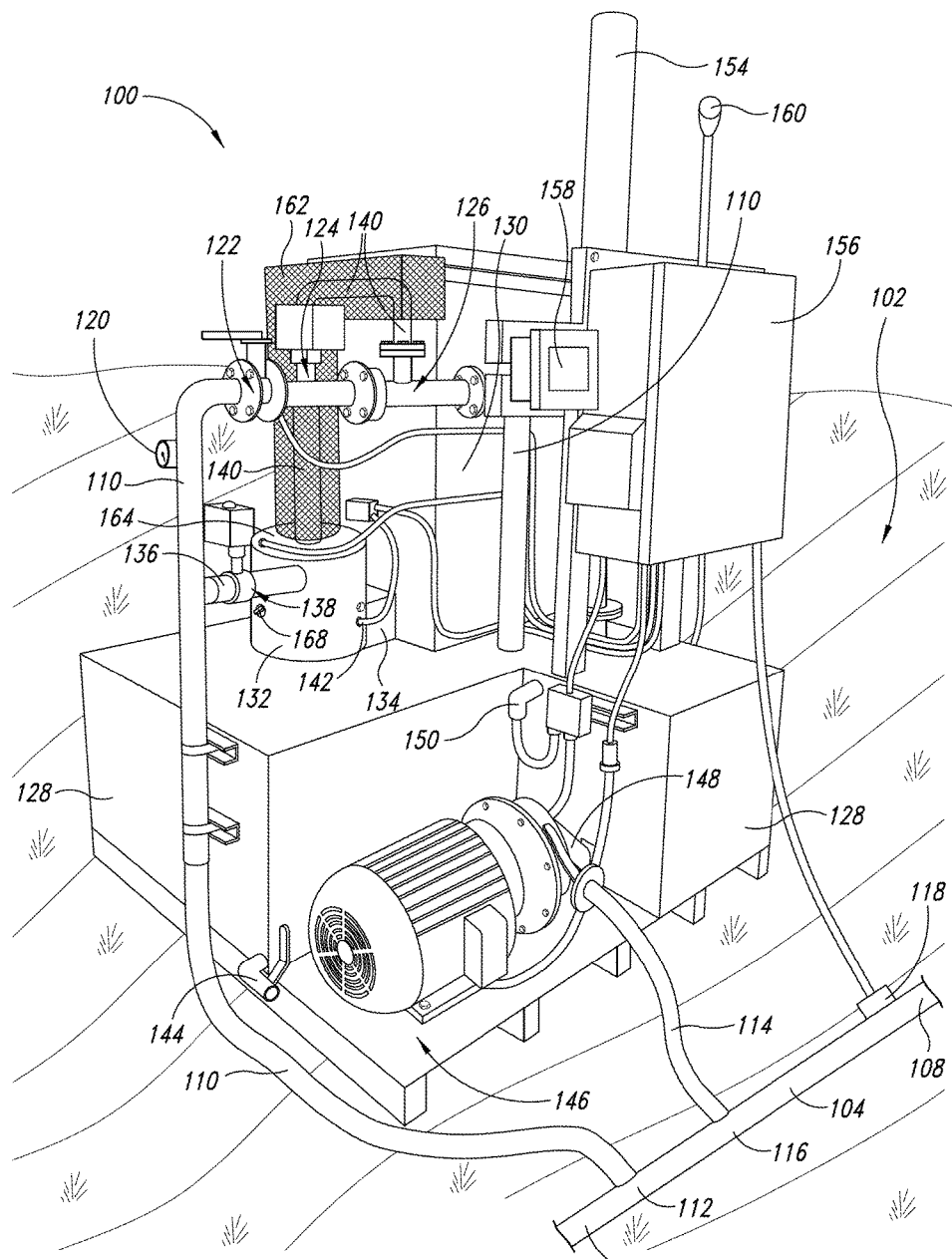
FIG. 1 illustrates a perspective view of a sulfur burner coupled to an irrigation system in a crop-growing field.

FIG. 1 illustrates a sulfur burner system 100. As illustrated in FIG. 1, the sulfur burner system 100 is located in a field 102 and is coupled to an irrigation pipe 104 of an irrigation system used to irrigate the field 102. The field 102 can be planted with seeds and can be used to grow any agricultural crop, such as corn, soybeans, wheat, tomatoes, potatoes, grapes, blueberries, or grasses. The field 102 can also be a lawn or a golf course covered in grass. The sulfur burner system 100 can have a relatively small footprint, can span across several rows, such as less than three, less than four, less than five, less than six, less than seven, or less than eight rows of crops in the field 102, and can have length and width dimensions in a top plan view that are less than five feet, less than six feet, less than eight feet, less than ten feet, or less than twelve feet. The irrigation pipe 104 has an upstream portion 106 and a downstream portion 108, such that water for irrigating the field 102 flows through the pipe 104 from the upstream portion 106 to the downstream portion 108.

The sulfur burner system 100 includes a water inlet conduit or pipe 110, which can draw water from the pipe 104 at a first joint 112 near the upstream portion 106 of the pipe 104, and into the sulfur burner system 100 for use therein. The sulfur burner system 100 also includes an outlet conduit or pipe 114, which can provide sulfurous acid from the sulfur burner system 100 to the pipe 104 at a second joint 116 downstream of the first joint 112. The sulfur burner system 100 also includes a pH sensor 118 that can measure or monitor the pH of the water travelling through the pipe 104 at a location downstream of the second joint 116 and near the downstream portion 108 of the pipe 104.

While the sulfur burner system 100 as illustrated in FIG. 1 draws water through the inlet pipe 110 from the same irrigation pipe 104 that it feeds sulfurous acid into through the outlet pipe 114, in other implementations, the sulfur burner system 100 draws water through the inlet pipe 110 from a different irrigation pipe than it feeds sulfurous acid into through the outlet pipe 114. Further, while the locations at which the water is drawn from the pipe 104 at joint 112, the sulfurous acid is introduced into the pipe 104 at joint 116, and the pH of the water in the pipe 104 is monitored by pH sensor 118 are illustrated as being relatively close to one another in FIG. 1, in alternative implementations these locations may be spread out further than as illustrated in FIG. 1.

The water inlet conduit or pipe 110 can have an inside or an outside diameter of about two inches and extends from the first joint 112 at the pipe 104 toward and into a body of the sulfur burner system 100. The water inlet conduit or pipe 110 includes a gage 120, which can be used to measure or monitor a pressure, a flow rate, or any other property of the water travelling through the pipe 110. The pipe 110 also includes a first, upstream valve 122, which can be a manually-operated and/or electronically-operated butterfly valve 122, as well as a second, downstream valve 124 that is just downstream of the first, upstream valve 122, and which can be a manually-operated and/or electronically-operated ball valve 124. The pipe 110 can also be referred to as a water intake or a water intake pipe 110, and the valves 122 and 124 can also be referred to as water intake valves 122 and 124.

The valves 122 and 124 are modulating flow control valves and are redundant with one another. Either one of the valves 122 and 124 can be operated as a primary valve that is opened and closed to control and allow or prevent the flow of water into the system 100 through the pipe 110. The other one of the valves 122 and 124 can be operated as a secondary or backup valve that generally remains open at all times. In some implementations, the ball valve 124 is the primary valve and the butterfly valve 122 is the secondary valve, while in other implementations, this arrangement can be reversed. If the primary valve breaks or malfunctions, then the secondary valve can be closed to shut off the flow of water into the system 100 through the pipe 110. The pipe 110 also includes a horizontally-oriented venturi injector 126 located just downstream of the second, downstream valve 124. From the venturi injector 126, the pipe 110 turns downward and is coupled to a large holding tank 128 at the bottom of the sulfur burner system 100.

The holding tank 128 can hold up to, or have a capacity of, 270 gallons of a liquid such as water and/or sulfurous acid, and includes an exhaust stack 154 through which gases from the tank 128, such as sulfur dioxide that did not mix into the water in the venturi injector 126 or react with the water to form sulfurous acid, is vented from the tank 128, out of the sulfur burner system 100, and into the surrounding environment. In some implementations, one or more sprinklers can be provided within the exhaust stack 154 and can spray a mist of water into the exhaust stack 154 to capture some of the vented sulfur dioxide and return it in liquid form to the tank 128. The one or more sprinklers can be provided with water from a valve coupled to the pipe 110 at a location upstream of the venturi injector 126.

As also illustrated in FIG. 1, the sulfur burner system 100 includes a sulfur hopper 130, which can be used to hold elemental sulfur or other chemical compounds or materials including or containing sulfur, such as in a solid pellet form. The sulfur burner system 100 also includes a hollow sulfur burner tank 132 with a sulfur burner chamber formed therein and a removable lid 164, which can be removed to clean the sulfur burner chamber, to remove obstructions, or to manually load additional sulfur into the sulfur burner chamber. The sulfur burner system 100 also includes a first automated igniter 142, which can extend through the sulfur burner tank 132 and into the sulfur burner chamber therein, a second automated igniter 166 (see FIG. 2), which can extend through the sulfur burner tank 132 and into the sulfur burner chamber therein, and a port 168 that includes an aperture extending through the sulfur burner tank 132 and into the sulfur burner chamber therein, through which a human operator can extend a manual igniter to manually ignite the sulfur within the sulfur burner tank 132. The first and second automated igniters 142 and 166 can be igniters commonly referred to as "hot rod" igniters or "hot surface" igniters.

The first and second automated igniters 142 and 166 are redundant with one another. Either one of the igniters 142 and 166 can be operated as a primary igniter to ignite the sulfur. The other one of the igniters 142 and 166 can be operated as a secondary or backup igniter that generally remains off at all times. If the primary igniter breaks or malfunctions, then the secondary igniter can be operated to ignite the sulfur.

The sulfur burner system 100 also includes a sulfur crossover or sulfur bridge 134, which can allow the solid pellets of sulfur material to migrate or move from the sulfur hopper 130 into the sulfur burner tank 132. For example, the solid pellets of sulfur material can migrate through the sulfur crossover 134 from the sulfur hopper 130 to the sulfur burner chamber within the sulfur burner tank 132, where they are burned or combusted to produce gaseous sulfur dioxide. New sulfur pellets can continually migrate through the sulfur crossover 134 to replenish the sulfur level within the sulfur burner chamber as the sulfur therein is burned or combusted. Thus, the sulfur burner tank 132 is gravity fed sulfur material from the sulfur hopper 130.

The sulfur burner tank 132 is coupled to an inlet conduit or pipe 136, which can also be referred to as an air intake or air intake pipe 136, through which air from the environment surrounding the sulfur burner system 100, including environmental oxygen, can flow into the sulfur burner chamber within the sulfur burner tank 132. The pipe 136 includes a valve 138, which can also be referred to as an air intake valve 138, and which can be a manually-operated and/or electronically-operated ball valve 138 to control the flow of air into the sulfur burner tank 132. The sulfur burner tank 132 is also coupled to an outlet conduit or pipe 140, through which the products of the burning of the sulfur within the sulfur burner tank 132 can be carried away and flow out of the sulfur burner chamber within the sulfur burner tank 132. In particular, the pipe 140 can carry such products from the sulfur burner chamber to a suction port of the venturi injector 126, where they can be introduced into the venturi injector 126 and mixed into the water flowing through the pipe 110. The sulfur burner system 100 includes a mesh guard 162 that surrounds the pipe 140, to protect the pipe 140 and to prevent inadvertent operator contact with the pipe 140, which can reach very high temperatures.

In one alternative implementation, the pipe 110 does not include the venturi injector 126. Instead, the pipe 140 extends directly into the pipe 110 and terminates at a bubbler within the pipe 110. Such an alternative implementation, which can be referred to as a "mixing valve" or a "mixing device," can create a greater degree of suction on the pipe 140 than the venturi injector 126 does, to assist in drawing gases through the pipe 140 and into the pipe 110 to be mixed into the water flowing therethrough.

As also illustrated in FIG. 1, the sulfur burner system 100 includes a manually-operated and/or electronically operated drain valve 144, which is fluidly coupled to a bottom of the holding tank 128, and which can be opened to drain a fluid such as water or sulfurous acid out of the holding tank 128. The sulfur burner system 100 also includes a variable speed injection pump 146. The injection pump 146 and the speed at which it operates can be controlled by a variable frequency drive. The injection pump 146 is coupled to an inlet conduit or pipe 148, which can carry and supply sulfurous acid from a bottom end of the holding tank 128 to the injection pump 146. The injection pump 146 is also coupled to the outlet conduit or pipe 114, which can carry and supply sulfurous acid from the injection pump 146 into the irrigation pipe 104 at the joint 116.

Figure 2:
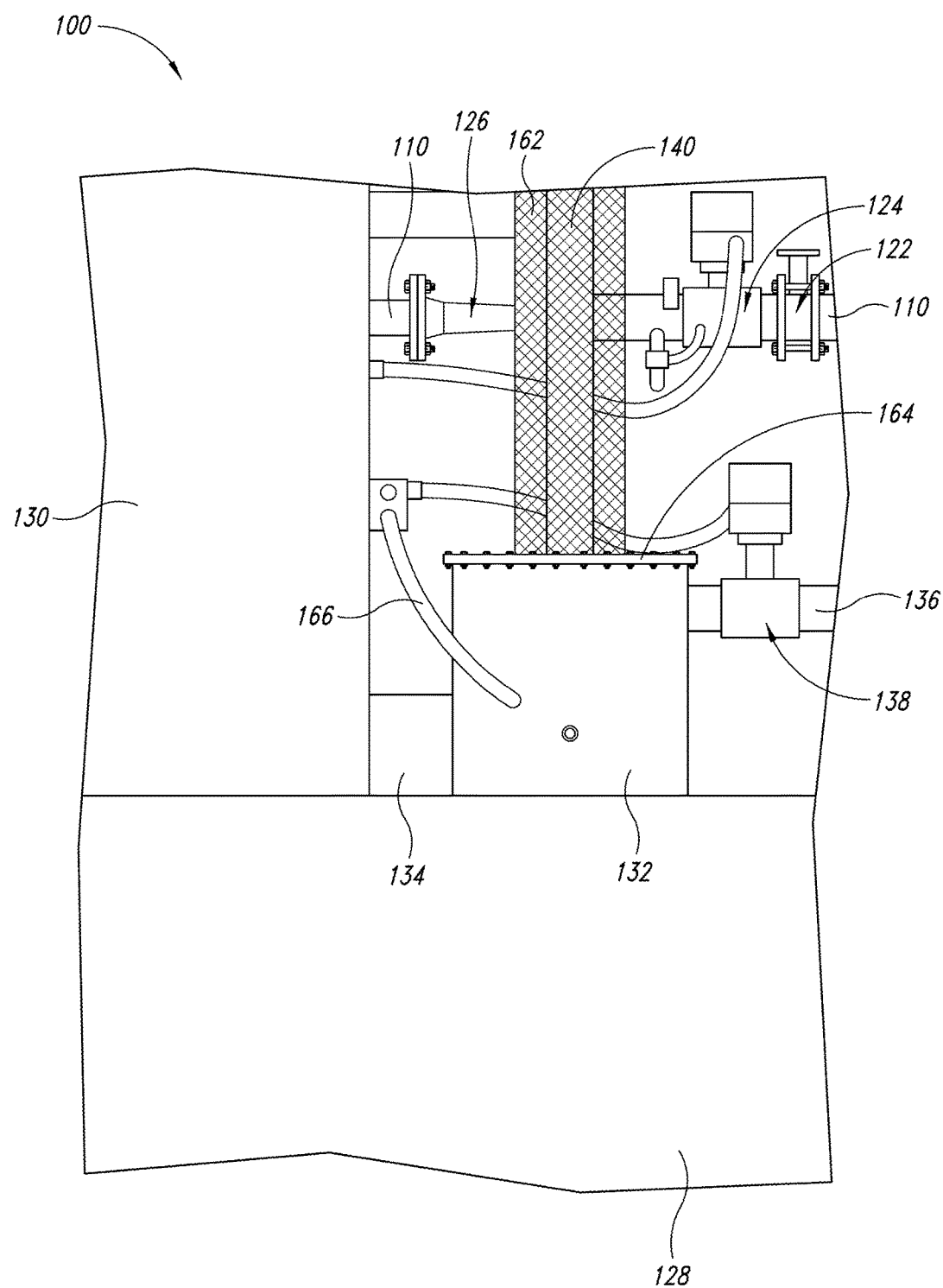
FIG. 2 illustrates a side view of a portion of the sulfur burner of FIG. 1, showing some features thereof at a larger scale.
Figure 3:
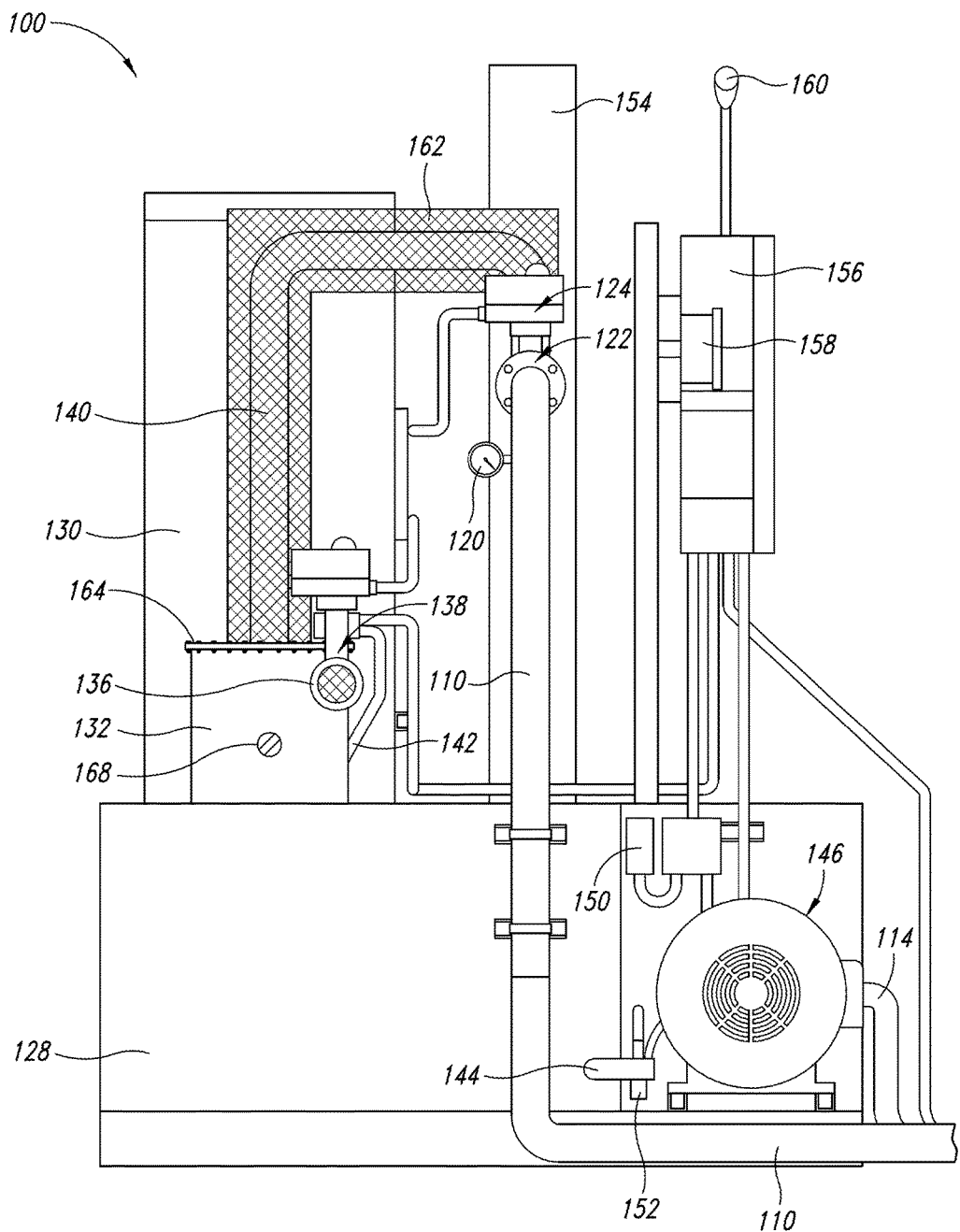
FIG. 3 illustrates an end view of a portion of the sulfur burner of FIG. 1, showing the sulfur burner isolated from the irrigation system.

FIG. 2 illustrates a side view of a portion of the sulfur burner system 100 with some of the features thereof at a larger scale. FIG. 3 illustrates an end view of the sulfur burner system 100. As illustrated in FIG. 3, the sulfur burner system 100 includes a first sensor assembly 150, which includes a high-level float that extends through the holding tank 128 and measures or monitors a level of liquid held within the holding tank 128, as well as a second sensor assembly 152, which includes a low-level float and a pressure transducer, which has no moving parts, that extend through the holding tank 128 and measure or monitor a level of liquid held within the holding tank 128. As also illustrated in FIG. 3, the pipe 136 includes a mesh covering its inlet to protect against the ingress of and prevent the entry of debris or pests such as animals and insects.

As illustrated in FIGS. 1 and 3, the sulfur burner system 100 includes an electronic control system held within an electronic control panel box 156, which can receive input from a human operator through a full color touch screen human machine interface 158, which can be mounted within a weatherproof enclosure, and which can provide output, such as alerts or alarms, by lighting up a raised light bulb 160 in at least one of various possible colors. The electronic control system held within the box 156 can include a programmable logic controller (PLC), and can be electronically and communicatively coupled to any of the other components of the system 100 described herein, including the touch screen device 158 to receive input therefrom and the light bulb 160 to provide output thereto. As further examples, the electronic control system can be electronically and communicatively coupled to the gage 120 to receive data therefrom, the valves 122, 124, 138, and 144 to provide commands to open or close thereto, the igniters 142 and 166 to provide commands to ignite the sulfur thereto, the pH sensor 118, to receive data therefrom, the pump 146 and the variable frequency drive thereof, to provide commands to operate at a specific speed or not to operate, and the sensor assemblies 150, 152, to receive data therefrom. As one further example, the electronic control system can be electronically and communicatively coupled to the overall irrigation system that includes the pipe 104 and that irrigates the field 102.

In some implementations, the raised light bulb 160 can be illuminated in a variety of colors, such as two, three, four, five, six, or eight different colors. The light bulb 160 can be used to give signals such as alerts or alarms to human operators of the field 102, of the irrigation system including the irrigation pipe 104, and of the sulfur burner system 100, such as to alert the operators to a malfunction or other issue or problem with the sulfur burner system 100. Providing the light bulb 160 in a raised location allows the operators to view the light bulb from greater distances. In some implementations, illuminating the light bulb 160 in a first color, such as green, can indicate that there are no problems with the system 100 and that the system 100 is operating under normal conditions. In some implementations, illuminating the light bulb 160 in a second color distinct from the first color, such as yellow, can indicate that there are problems with the system 100, but that they are not urgent. In some implementations, illuminating the light bulb 160 in a third color distinct from the first and second colors, such as red, can indicate that there are problems with the system 100, and that the problems require urgent attention.

One example of a problem that can arise includes a failure of the sulfur burner tank 132, which can include a failure of the sulfur therein to ignite or combust, which can be indicated by the failure of a thermometer or a thermostat positioned within the outlet pipe 140 to reach a threshold elevated temperature within a threshold period of time, or which can be indicated by the failure of the pH sensor 118 to measure a changed pH within the irrigation pipe 104 within a threshold period of time, such as 30 minutes, after a command is sent by the electronic control system to the igniter(s) 142 and/or 166 to ignite the sulfur. The detection of such a problem can be signaled by illuminating the light bulb 160 in the third color, e.g., red. Another example of a problem that can arise includes a failure of one or both of the first and second igniter(s) 142 and/or 166 to function properly, which can be indicated by the failure of a current sensor coupled to one of the igniters 142 and 166 to indicate that the igniter is drawing at least a threshold current. The detection of such a problem in just one of the igniters 142 and 166, such as the primary igniter, can be signaled by illuminating the light bulb 160 in the second color, e.g., yellow. The detection of such a problem in both of the igniters 142 and 166 can be signaled by illuminating the light bulb 160 in the third color, e.g., red. Another example of a problem that can arise includes one or more fault conditions of the injection pump 146 or the variable frequency drive thereof, which can be indicated by one or more of a set of auxiliary contacts coupled to the injection pump 146 or the variable frequency drive thereof. The detection of such a problem can be signaled by illuminating the light bulb 160 in the third color, e.g., red.

Another example of a problem that can arise includes a failure of either of the ball valves 124 and 138, which can be indicated by a limit switch of the respective ball valve 124 or 138 indicating that the valve is actually open after it has received a command to close or indicating that the valve is actually closed after it has received a command to open. The detection of such a problem can be signaled by illuminating the light bulb 160 in the third color, e.g., red. Another example of a problem that can arise includes the level of the sulfur material in the sulfur hopper 130 running low or running out, which can be indicated by an ultrasonic sensor mounted at the top of the sulfur hopper 130 and positioned to measure the level of the sulfur material within the hopper 130. The detection of such a problem can be signaled by illuminating the light bulb 160 in the second color, e.g., yellow. Other examples of problems that can arise include one or more fault conditions of the pH sensor, and one or more fault conditions of the pressure transducer measuring the level of the sulfurous acid within the holding tank 128.

When one of the foregoing problems, or any other problem, arises within the sulfur burner system 100, a signal indicating that the problem has arisen, which can be referred to as an alert or an alarm, can be transmitted to the electronic control system of the sulfur burner system 100. Upon receiving such a signal, the electronic control system can take appropriate action, such as attempting to remedy the problem if possible, or relaying the signal, such as to an operator, to the irrigation system including the irrigation pipe 104, or to the light bulb 160. Upon receiving such a signal, the electronic control system can also relay the signal to the touch screen 158, which can then present a description of the problem, a layout or diagram of the sulfur burner system 100 with the location of the problem indicated, and a description of possible actions to correct the problem.

In some implementations, the sulfur burner system 100 and its electronic control system include a remote dialer and/or a cellular router, and are communicatively coupled to remote electronic devices or systems, such as through the internet. In such implementations, any of the measurements, data, or information received or held by the sulfur burner system 100 and its electronic control system, and any of the alerts discussed herein, can be transmitted through the internet to the remote electronic devices or systems, such as for use by a human operator. In such implementations, any of the input received by the sulfur burner system 100 and its electronic control system, such as through the touch screen 158, can be received through the internet from the remote electronic devices or systems, such as from a human operator. Thus, a human operator can control or change the operation of the sulfur burner system 100 and monitor its performance remotely, from anywhere an internet connection is available, over the internet. The sulfur burner system 100 can connect to the internet over wires or wirelessly, or over a pre-existing communications system present at the field 102, such as a radio-wave based communications system.

The touch screen 158 can also provide additional output or information to a human operator, such as an identification of the state of operation of the sulfur burner system 100 (e.g., whether sulfur is burning, whether water is running into the system 100, and whether sulfurous acid is running out of the system 100), a level of the sulfur material in the hopper 130, a level of the sulfurous acid in the holding tank 128, and the positions of the ball valves 124 and 138. The electronic control system of the sulfur burner system 100 can also maintain, and the touch screen 158 can display, lists of events that occurred within the sulfur burner system 100, including the time of day at which the various valves are opened and closed, the time of day at which combustion of the sulfur begins and ends, and the time of day and identity of any problems that arise. The electronic control system of the sulfur burner system 100 can also maintain a log of the pH measurements over time, and the touch screen 158 can display such information over a user-selectable timeframe, such as in a chart or graph, so that a human operator can view changes to the operation of the system 100 and to the resulting pH of the water carried by the irrigation pipe 104 over time.

The sulfur burner system 100 can remain in the field 102 through all sorts of weather conditions, and is built to perform in the wind, rain, snow, hail, etc., and in a wide range of temperatures, including freezing temperatures and very hot temperatures. While the devices and systems described herein are described primarily as being automated, in alternative implementations, any of the devices or systems described herein can be controlled or operated manually by a human operator, such as by using the touch screen 158. Further, while the sulfur burner system 100 is described as being useful to lower the pH of water used for agricultural irrigation, water having a lower pH can also help to keep pipe and irrigation systems clean from buildup. In some alternative implementations, the inlet pipe 110 and the outlet pipe 114 can be positioned with their respective openings in a pond, and the sulfur burner system 100 can be operated to lower the pH of the pond to clean the pond, such as by killing bacteria and/or algae growing in or around the pond.

A method of using the sulfur burner system 100 includes a human operator installing the system 100 as described herein by positioning the system 100 in the field 102 and coupling the inlet pipe 110, the outlet pipe 114, and the pH sensor 118 to an irrigation pipe 104 in the field 102. The method can also include the human operator electronically and communicatively coupling the electronic control system of the sulfur burner system 100 to a control system for the irrigation system that includes the pipe 104 and irrigates the field 102. The method can also include the human operator inputting preferences for the operation of the system 100 via the touch screen 158.

Such preferences can include a preferred or desired pH of water for use in irrigating the field 102, which can depend on the specific crops to be grown in the field 102. In some implementations, the desired pH of the water for use in irrigating the field 102 is less than 7.0, less than 6.5, less than 6.0, less than 5.5, less than 5.0, or less than 4.5, and greater than 4.0, greater than 4.5, greater than 5.0, greater than 5.5, greater than 6.0, or greater than 6.5. In one specific implementation, the desired pH of the water for use in irrigating the field 102 is less than 6.0 and greater than 5.5, or about 5.5. The human operator can then leave the sulfur burner system 100 alone, and the sulfur burner system will automatically ensure that the water travelling through the downstream portion 108 of the irrigation pipe 104 has the preferred or desired pH.

Once the human operator has installed the system 100, input the preferences, and then left the sulfur burner system 100 alone, the electronic control system can wait until it receives a signal that the irrigation system including the pipe 104 has been switched on. Upon receiving such a signal, the electronic control system of the sulfur burner system 100 can transmit a command to the valve 138 to open, and the valve 138 can receive the command and be electronically opened in response. Air, including environmental oxygen, thus flows through the inlet pipe 136 and valve 138 and into the sulfur burner chamber within the sulfur burner tank 132. The electronic control system can also transmit commands to the igniter(s) 142 and/or 166 to ignite the sulfur within the sulfur burner tank 132, and the igniter(s) 142 and/or 166 can receive the commands and ignite the sulfur within the tank 132 in response. In some implementations, the igniters 142 and 166 can be positioned at a location slightly below an upper surface of the sulfur within the sulfur burner chamber, and can be heated to a predetermined, relatively high temperature and remain at the predetermined temperature for a predetermined period of time to ignite the sulfur. In some cases, the predetermined period of time can be selected by a human operator and provided as input to the sulfur burner system 100 and its electronic control system, such as through the touch screen 158 or over the internet. In some cases, the predetermined period of time is 5 or 10 minutes.

The electronic control system can then transmit a command to the primary valve of the valves 122 and 124 to open, and the primary valve of the valves 122 and 124 can receive the command and be electronically opened in response. Water thus flows from the upstream portion 106 of the pipe 104, through the inlet pipe 110, through the valves 122 and 124, through the venturi injector 126 or other mixing device, and into the holding tank 128. Gaseous sulfur dioxide is generated within the sulfur burner tank 132, flows through the outlet pipe 140 and into the venturi injector 126 or other mixing device, where it is injected into, or absorbed into, the water flowing therethrough. The sulfur dioxide reacts with the water to form sulfurous acid, which is then carried through the rest of the pipe 110 into the holding tank 128.

While the sulfur burner system 100 operates in this manner, the sensors of the first and second sensor assemblies 150, 152, including the high-level float, low-level float, and/or pressure transducer, measure the level of the sulfurous acid building up within the holding tank 128 and provide data indicative of such level to the electronic control system. In some implementations, the data provided by the pressure transducer is considered the primary measurement of the level of the sulfurous acid in the holding tank 128, and in ordinary operation, this data can be used to control operation of the sulfur burner system 100. In such implementations, the data provided by the high-level float and low-level float are considered secondary or backup measurements of the level of the sulfurous acid in the holding tank 128, and in ordinary operation, this data can be used as a check on the data provided by the pressure transducer. The data provided by the high-level and low-level floats can also be used in the event the pressure transducer breaks of malfunctions. Once the electronic control system receives data from the sensors indicating that the holding tank is about 40% full, about 50% full, about 60% full, or between 40% and 60% full, the electronic control system transmits commands to the valves 122, 124, and/or 138 to close, and the valves 122, 124, and/or 138 can receive the commands and be electronically closed in response.

In some implementations, the electronic control system transmits a command to the primary valve of the valves 122 and 124 to close, and also transmits a command to the valve 138 to close, and the primary valve of the valves 122 and 124 and the valve 138 receive the commands and are electronically closed in response. In such an embodiment, water and air stop flowing into the system 100, the sulfur stops burning within the sulfur burner chamber, and the holding tank 128 stops filling with sulfurous acid. In other implementations, the electronic control system transmits a command to the primary valve of the valves 122 and 124 to close, but does not also transmit a command to the valve 138 to close, and the primary valve of the valves 122 and 124 receives the command and is electronically closed in response, but the valve 138 does not receive such a command and is not closed. In such an embodiment, water stops flowing into the system 100 but air does not, the sulfur continues burning within the sulfur burner chamber, the resulting sulfur dioxide travels through the pipe 140, through the venturi injector 126 or other mixing device, through the holding tank 128, and out of the system 100 through the exhaust stack 154, and the holding tank 128 stops filling with sulfurous acid.

Throughout the operational lifetime of the system 100, the electronic control system continues to monitor the data provided by the sensors of the first and second sensor assemblies 150, 152, and transmits commands to the valves 122, 124, and/or 138, and/or the igniters 142 and 166 based on the received data. In some implementations, for example, the electronic control system transmits commands to the valves 122, 124, and/or 138 to open, and to the igniter(s) 142 and/or 166 to ignite the sulfur, when the level of the sulfurous acid in the holding tank 128 drops below a threshold low level, such as 10%, 20%, 30%, 40%, or 50% of the volumetric capacity or of the water head height capacity of the holding tank 128, such as to prevent the injection pump 146 running dry and incurring resulting damage or destruction. In some implementations, as another example, the electronic control system transmits commands the valves 122, 124, and/or 138 to close when the level of the sulfurous acid in the holding tank 128 exceeds a threshold high level, such as 90%, 80%, 70%, 60%, or 50% of the volumetric capacity or of the water head height capacity of the holding tank 128, such as to prevent overflow of the holding tank 128.

Once the holding tank 128 holds a sufficient amount of sulfurous acid and a threshold period of time has passed since the electronic control system transmitted commands to the igniter(s) 142 and/or 166 to ignite the sulfur, the pH sensor 118 measures the pH of the water within the downstream portion 108 of the pipe 104 and transmits the results of such measurements to the electronic control system. In some cases, the threshold period of time can be selected by a human operator and provided as input to the sulfur burner system 100 and its electronic control system, such as through the touch screen 158 or over the internet. In some cases, the threshold period of time is 30 minutes. The electronic control system receives the measurements from the pH sensor 118 and compares a first one of the measurements to the preferred or desired pH of water for use in irrigating the field 102 input by the human operator.

If the measured pH matches the desired pH, then the electronic control system takes no further action in response to the receipt of the measurements. If the measured pH is higher than the desired pH, then the electronic control system checks that a sufficient amount of sulfurous acid is present in the holding tank 128 (e.g., that the level of the sulfurous acid in the holding tank 128 is not below the threshold low level). If a sufficient amount of sulfurous acid is present in the holding tank 128, then the electronic control system transmits a command to the injection pump 146 to begin pumping sulfurous acid from the holding tank 128, through the outlet pipe 114, through the joint 116, and into the irrigation pipe 104. If a sufficient amount of sulfurous acid is not present in the holding tank 128, then the electronic control system either does not transmit a command to the injection pump 146 to begin pumping, or transmits a command to the injection pump 146 to begin pumping at a very slow rate.

The pH sensor 118 continues to measure the pH of the water within the downstream portion 108 of the pipe 104 and continues to transmit the results of such measurements to the electronic control system. In some cases, these measurements are taken at a rate of 100 or more per second, 200 or more per second, or 500 or more per second. The electronic control system continues to receive the measurements from the pH sensor 118 and continues to compare the measurements to the preferred or desired pH of water for use in irrigating the field 102 input by the human operator. In some cases, the electronic control system compares a measurement to the preferred or desired pH only once in a given interval. The interval can be selected by the human operator to ensure that operational changes made in response to a first measurement have sufficient time to take effect before operational changes are made in response to a second measurement. In some cases, the interval is about two minutes, or about three minutes, or about four minutes, or about five minutes, or between two and five minutes, or between 10 seconds and 500 seconds. The interval can be selected by a human operator and provided as input to the sulfur burner system 100 and its electronic control system, such as through the touch screen 158 or over the internet.

If a second measurement of the pH matches the desired pH, then the electronic control system takes no further action in response to the receipt of the measurements. If the second measurement of the pH is higher than the desired pH, then the electronic control system checks that a sufficient amount of sulfurous acid is present in the holding tank 128. If a sufficient amount of sulfurous acid is present in the holding tank 128, then the electronic control system transmits a command to the injection pump 146 to begin pumping sulfurous acid from the holding tank 128, through the outlet pipe 114, through the joint 116, and into the irrigation pipe 104 at a faster rate. The faster rate can be faster than the previous rate by a increment selected by a human operator and provided as input to the sulfur burner system 100 and its electronic control system, such as through the touch screen 158 or over the internet. In some cases, the increment can be 0.5% or 1.0% of the previous rate. The injection pump 146 can receive the command and begin pumping at a faster rate in response. If a sufficient amount of sulfurous acid is not present in the holding tank 128, then the electronic control system either does not transmit a command to the injection pump 146 to begin pumping at a faster rate, or transmits a command to the injection pump 146 to begin pumping at only a very slightly faster rate. The injection pump 146 can receive the command and respond accordingly.

If the second measurement of the pH is lower than the desired pH, then the electronic control system transmits a command to the injection pump 146 to begin pumping sulfurous acid from the holding tank 128, through the outlet pipe 114, through the joint 116, and into the irrigation pipe 104 at a slower rate. The slower rate can be slower than the previous rate by a increment selected by a human operator and provided as input to the sulfur burner system 100 and its electronic control system, such as through the touch screen 158 or over the internet. In some cases, the increment can be 0.5% or 1.0% of the previous rate. The injection pump 146 can receive the command and begin pumping at a slower rate in response.

The pH sensor 118 continues to measure the pH of the water within the downstream portion 108 of the pipe 104 and continues to transmit the results of such measurements to the electronic control system. The electronic control system continues to receive the measurements from the pH sensor 118, continues to compare the measurements to the preferred or desired pH of water for use in irrigating the field 102 input by the human operator, and continues to transmit commands to the injection pump 146 based on the results of the comparisons. Thus, by drawing water from the irrigation pipe 104 at an upstream location, introducing acidic compounds into the irrigation pipe 104 at an intermediate location, and measuring the pH of the water in the irrigation pipe 104 at a downstream location, and using the measurements to control the rate at which the acidic compounds are introduced, the sulfur burner system 100 can lower the pH of the water flowing through the irrigation pipe 104 and ensure that the water flowing through the downstream portion 108 of the irrigation pipe 104 has a desired pH.

Over time, a human operator can generally expect that the speed at which the injection pump 146 pumps sulfurous acid into the irrigation pipe 104 will stabilize or reach an equilibrium speed. Such an equilibrium speed can be defined as a percentage of the maximum capacity of the injection pump 146. Once an equilibrium speed has been reached and maintained for a threshold period of time, such as one hour, two hours, three hours, four hours, or between one and four hours, the electronic control system of the sulfur burner system 100 can set a maximum speed and a minimum speed for the operation of the injection pump 146. The maximum speed can be set at 5 or 10 percent above the equilibrium speed, or can be set at 5 or 10 percent of the maximum capacity of the injection pump above the equilibrium speed, and the minimum speed can be set at 5 or 10 percent below the equilibrium speed, or can be set at 5 or 10 percent of the maximum capacity of the injection pump below the equilibrium speed. As one example, if the equilibrium speed is 30 percent of the maximum capacity of the injection pump, then the maximum speed can be set at 31.5, 33, 35, or 40 percent thereof, and the minimum speed can be set at 28.5, 27, 25, or 20 percent thereof. Such maximum and minimum speed thresholds can be useful safeguards in the event of a malfunction in the pH sensor, to ensure the operational speed of the injection pump 146 does not deviate too far from the equilibrium speed.

Eventually, such as at the end of an irrigation cycle, the electronic control system can receive a signal that the irrigation system including the pipe 104 has been switched off. Upon receiving such a signal, the electronic control system of the sulfur burner system 100 can transmit a command to the primary valve of the valves 122 and 124 to close, and the primary valve of the valves 122 and 124 can receive the command and be electronically closed in response. Water thus stops flowing from the upstream portion 106 of the pipe 104, through the inlet pipe 110, through the valves 122 and 124, through the venturi injector 126 or other mixing device, and into the holding tank 128. The electronic control system can then transmit a command to the valve 138 to close, and the valve 138 can receive the command and be electronically closed in response. Air, including environmental oxygen, thus stops flowing through the inlet pipe 136 and valve 138 and into the sulfur burner chamber within the sulfur burner tank 132, and combustion of the sulfur is extinguished. Gaseous sulfur dioxide is then no longer generated within the sulfur burner tank 132, and stops flowing through the outlet pipe 140 and into the venturi injector 126 or other mixing device. Thus, sulfurous acid is no longer generated by the sulfur burner system 100.

From time to time, a human operator of the sulfur burner 100 may test or measure the pH of the water provided by the irrigation system including the irrigation pipe 104 to the field 102 with pH sensors independent of those of the sulfur burner 100. If such measurements reveal that the actual pH of the water being delivered by the irrigation system does not match the desired pH of the water within an acceptable margin of error, then the human operator may calibrate or re-calibrate the pH sensor 118. Such calibration or re-calibration can include removing the pH sensor 118 from the irrigation pipe 104, placing the pH sensor into a first calibration solution having a first known pH, which can be 7.0, and then inputting the first known pH into the electronic control system of the sulfur burner system 100, such as through the touch screen 158 or over the internet. Such calibration or re-calibration can also include placing the pH sensor into a second calibration solution having a second known pH, which can be 4.0, inputting the second known pH into the electronic control system of the sulfur burner system 100, such as through the touch screen 158 or over the internet, and re-installing the pH sensor within the irrigation pipe 104. In some cases, such calibration or re-calibration can be done weekly or at other set intervals.

When appropriate, the sulfur burner system 100 can be uninstalled and removed from the field 102. For example, the inlet pipe 110 can be decoupled from the irrigation pipe 104, the outlet pipe 114 can be decoupled from the irrigation pipe 104, and the pH sensor 118 can be decoupled from the irrigation pipe 104. The electronic and communicative connection between the electronic control panel of the sulfur burner 100 and the overall irrigation system that includes the pipe 104 and that irrigates the field 102 can be undone. The drain valve 144 can be opened to drain sulfurous acid remaining in the holding tank 128 out of the system 100. The sulfur burner system 100 can then be removed from the field 102.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
    a sulfur burner coupled to an irrigation pipe, the sulfur burner including a tank holding sulfurous acid, a variable speed injection pump having an inlet and an outlet, and a conduit that fluidically couples the tank to the inlet of the pump;
    an inlet pipe having an inlet and an outlet, the inlet of the inlet pipe coupled to the irrigation pipe at a first joint and the outlet of the inlet pipe coupled to the sulfur burner;
    an outlet pipe having an inlet and an outlet, the inlet of the outlet pipe coupled to the outlet of the pump and the outlet of the outlet pipe coupled to the irrigation pipe at a second joint, the second joint downstream of the first joint along the irrigation pipe;
    a pH sensor coupled to the irrigation pipe at a measurement location, the measurement location downstream of the second joint along the irrigation pipe; and
    an electronic control system;
    wherein the electronic control system is electronically and communicatively coupled to the pH sensor to receive data representative of pH measurements taken by the pH sensor from pH sensor;
    wherein the sulfur burner includes an electrically-powered hot surface igniter and the electronic control system is electronically and communicatively coupled to the hot surface igniter to provide commands to the hot surface igniter;
    wherein the sulfur burner includes an electrically-powered air intake valve and the electronic control system is electronically and communicatively coupled to the air intake valve to provide commands to the air intake valve;
    wherein the sulfur burner includes an electrically-powered water intake valve and the electronic control system is electronically and communicatively coupled to the water intake valve to provide commands to the water intake valve;
    wherein the sulfur burner includes a pressure transducer to measure a liquid level within the tank, and the electronic control system is electronically and communicatively coupled to the pressure transducer to receive data representative of liquid level measurements taken by the pressure transducer from the pressure transducer; and
    wherein the electronic control system is electronically and communicatively coupled to the pump to provide commands to the pump.

2. The system of claim 1 wherein the electronic control system is electronically and communicatively coupled to the pH sensor to receive data representative of pH measurements taken by the pH sensor from the pH sensor.

3. The system of claim 1 wherein the sulfur burner includes an electrically-powered hot surface igniter and the electronic control system is electronically and communicatively coupled to the hot surface igniter to provide commands to the hot surface igniter.

4. The system of claim 1 wherein the sulfur burner includes an electrically-powered air intake valve and the electronic control system is electronically and communicatively coupled to the air intake valve to provide commands to the air intake valve.

5. The system of claim 1 wherein the sulfur burner includes an electrically-powered water intake valve and the electronic control system is electronically and communicatively coupled to the water intake valve to provide commands to the water intake valve.

6. The system of claim 1 wherein the sulfur burner includes a pressure transducer to measure a liquid level within the tank, and wherein the electronic control system is electronically and communicatively coupled to the pressure transducer to receive data representative of liquid level measurements taken by the pressure transducer from the pressure transducer.

7. A method, comprising:

coupling an inlet of an inlet pipe to an irrigation pipe at a first joint and an outlet of the inlet pipe to a sulfur burner;

coupling an inlet of an outlet pipe to an outlet of a variable speed injection pump of the sulfur burner and an outlet of the outlet pipe to the irrigation pipe at a second joint, the second joint downstream of the first joint along the irrigation pipe;

coupling a pH sensor to the irrigation pipe at a measurement location, the measurement location downstream of the second joint along the irrigation pipe;

using the pump to pump sulfurous acid from a holding tank of the sulfur burner through the outlet pipe into the irrigation pipe;

using the sensor to take a measurement of a pH of fluids within the irrigation pipe at the measurement location;

transmitting data representative of the measurement from the pH sensor to an electronic control system of the sulfur burner system;

comparing the measurement of the pH with a desired pH of the fluids within the irrigation pipe at the measurement location;

determining that the measurement of the pH is higher than the desired pH;

in response to determining that the measurement of the pH is higher than the desired pH, transmitting a command to the variable speed injection pump to pump sulfurous acid from the holding tank, through the outlet pipe, through the second joint, and into the irrigation pipe at a faster rate; and in response to transmitting the command to the injection pump, pumping sulfurous acid from the holding tank, through the outlet pipe, through the second joint, and into the irrigation pipe at the faster rate.

8. The system of claim 1 wherein the outlet of the inlet pipe is coupled to the sulfur burner by a first flow control valve and a second flow control valve in series with the first flow control valve, wherein the first flow control valve is a ball valve and the second flow control valve is a butterfly valve.

9. The system of claim 1 wherein the sulfur burner includes a first electrically-powered hot surface igniter and a second electrically-powered hot surface igniter.

10. The method of claim 7, further comprising:
detecting the existence of a problem in the sulfur burner;
determining whether the problem is urgent; and
illuminating a raised light bulb of the sulfur burner in one of a plurality of colors based on whether the problem is urgent.

11. The method of claim 7, further comprising:
detecting a failure of sulfur within the sulfur burner to ignite based on a measurement taken by a thermometer; and
in response to the detecting of the failure, illuminating a raised light bulb of the sulfur burner.

12. The method of claim 7, further comprising:
detecting a failure of an igniter of the sulfur burner based on a measurement taken by a current sensor; and
in response to the detecting of the failure, illuminating a raised light bulb of the sulfur burner.

13. The method of claim 7, further comprising:
detecting a failure of the pump; and
in response to the detecting of the failure, illuminating a raised light bulb of the sulfur burner.

14. The method of claim 7, further comprising:
detecting a failure of an inlet valve of the sulfur burner; and
in response to the detecting of the failure, illuminating a raised light bulb of the sulfur burner.

15. The method of claim 7, further comprising:
detecting a low level of a supply of sulfur within the sulfur burner based on a measurement taken by an ultrasonic sensor; and
in response to the detecting of the low level of the supply of sulfur, illuminating a raised light bulb of the sulfur burner.

16. The method of claim 7, further comprising:
using the pH sensor to take a plurality of measurements of a pH of fluids within the irrigation pipe at the measurement location; and
maintaining a log of the pH measurements taken by the pH sensor.

17. The method of claim 7, further comprising:
detecting that the sulfurous acid has reached a threshold level in the holding tank; and
in response to the detecting that the sulfurous acid has reached a threshold level, closing a water intake valve of the sulfur burner.

* * * * *